United States Patent [19]
La Moreux

[11] 3,736,665
[45] June 5, 1973

[54] DEVICE FOR TESTING BALL JOINTS, KING PINS AND THE LIKE

[75] Inventor: Clarence E. La Moreux, Winter Haven, Fla.

[73] Assignee: Maurex Inc., Orlando, Fla.

[22] Filed: Oct. 30, 1970

[21] Appl. No.: 85,325

[52] U.S. Cl. ........... 33/169 R, 33/174 Q, 33/203, 33/203.16
[51] Int. Cl. ............... G01b 5/24, G01b 3/22
[58] Field of Search ............... 33/169 R, 172 R, 33/174 Q, 172 B, 174 L, 203, 203.15, 203.16, 203.18

[56] References Cited
UNITED STATES PATENTS

| | | |
|---|---|---|
| 3,242,579 | 3/1966 | Cermenaro et al. ............ 33/169 R |
| 1,565,920 | 12/1925 | Flick ............ 33/203.19 |
| 3,181,245 | 5/1965 | Bullinger ............ 33/203.15 X |
| 3,581,403 | 6/1971 | Tuttle ............ 33/203.16 |

Primary Examiner—William D. Martin, Jr.
Attorney—Zalkind, Horne and Shuster

[57] ABSTRACT

A ball joint or king pin tester for automotive vehicles having means to oscillate the ball joint or king pin so as to displace the wearing parts thereof with respect to one another, and having means to measure the amount of such displacement so that appropriate maintenance may be provided if necessary. The device also comprises a pressure roller for testing tire out-of-roundness.

10 Claims, 6 Drawing Figures

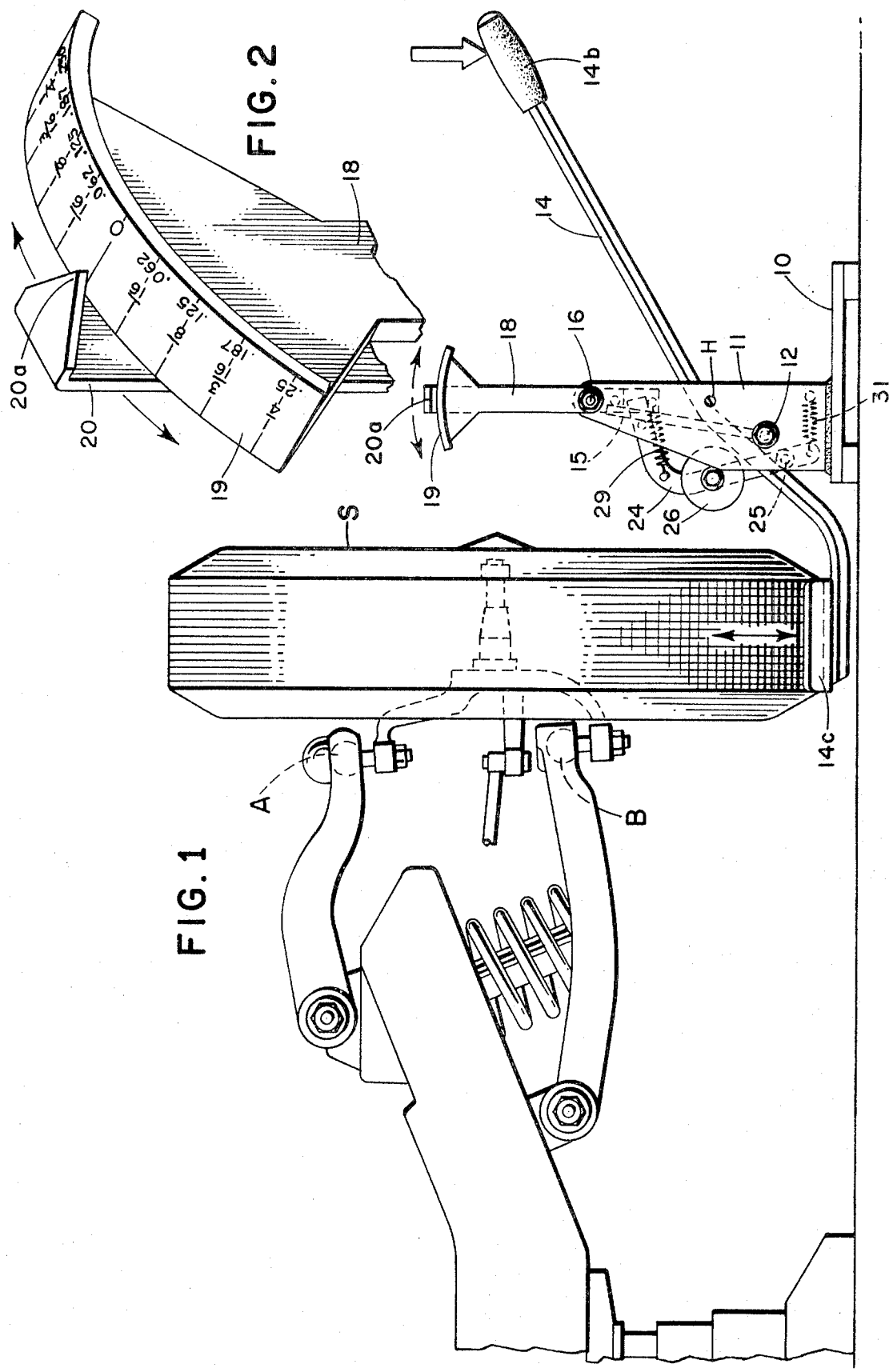

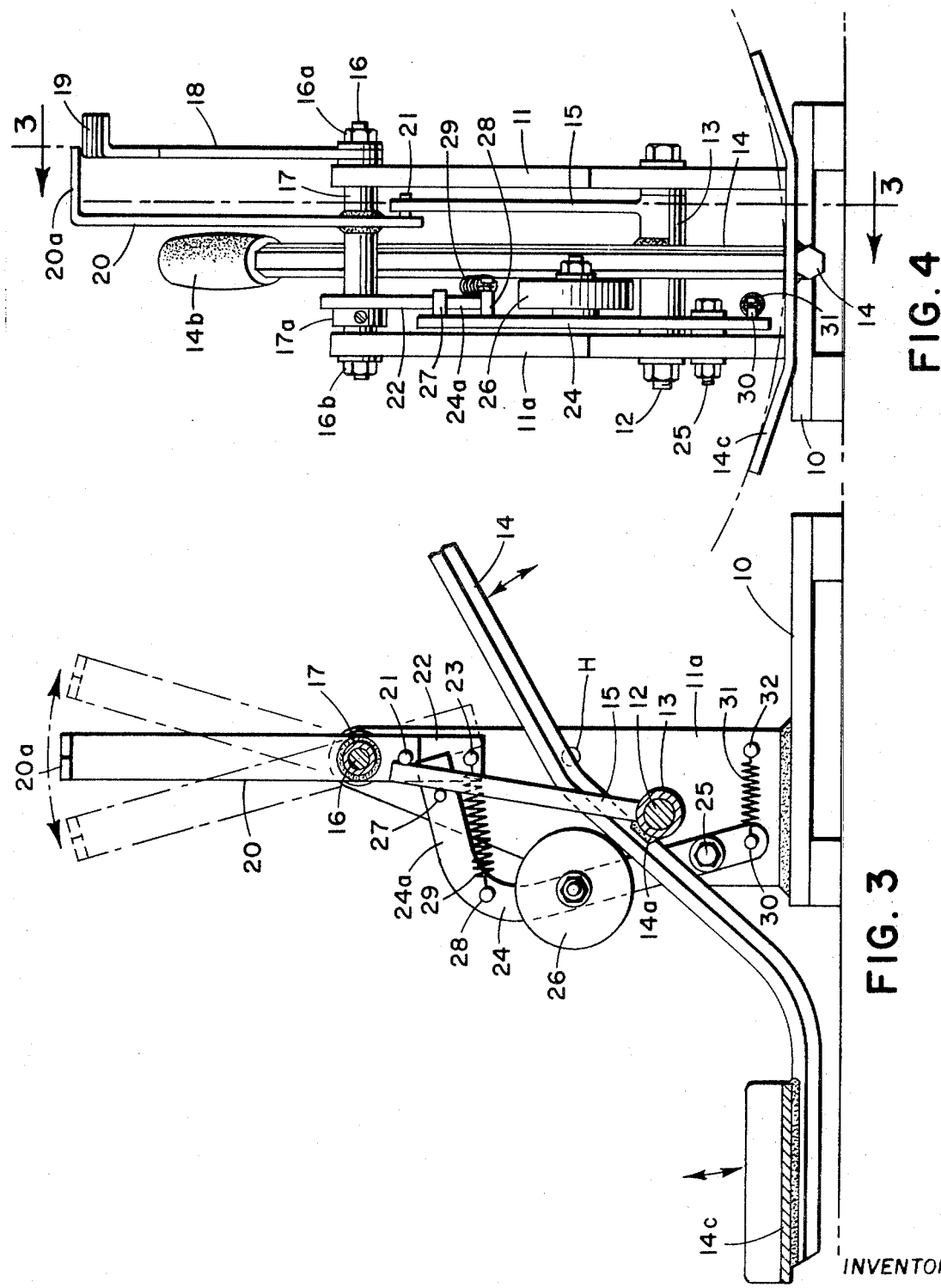

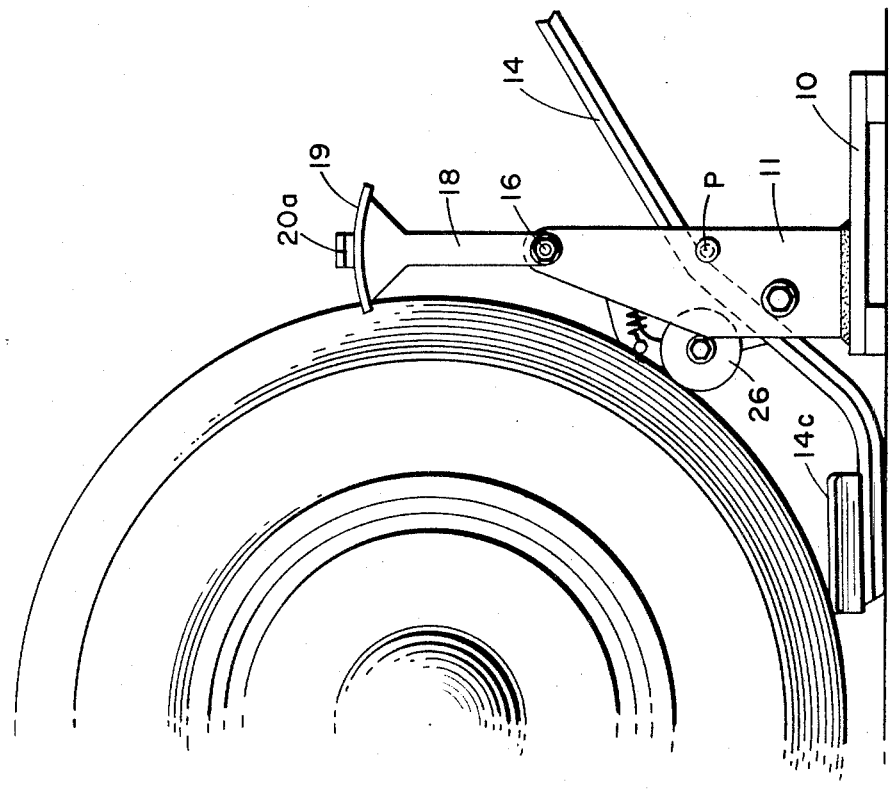
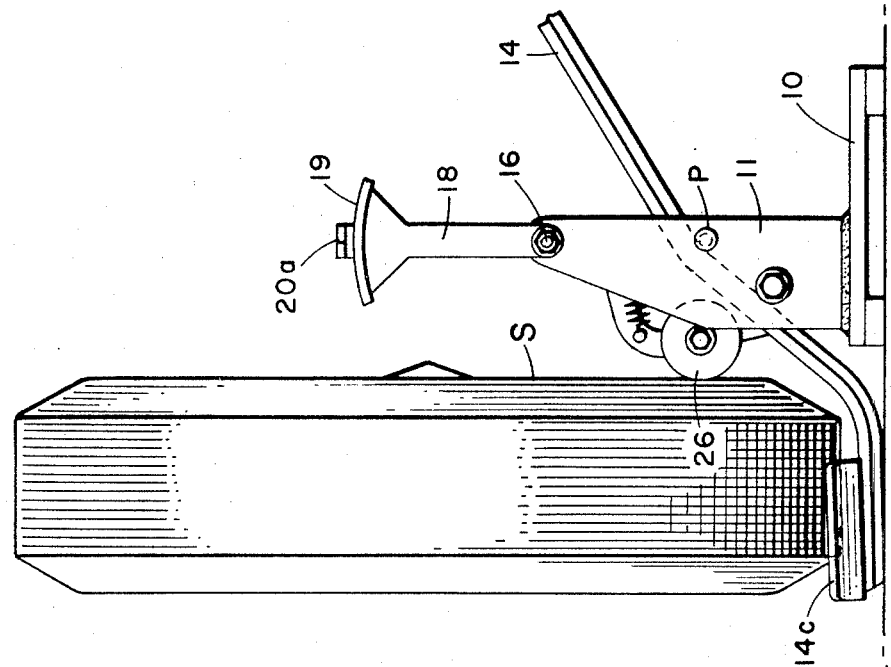

DEVICE FOR TESTING BALL JOINTS, KING PINS AND THE LIKE

The invention relates to a device for testing the ball joints and king pin joints of automotive vehicles, for testing the out-of-roundness of tires, and for measuring the amounts of play in said joints and tires to determine whether repair or replacement is necessary.

Such devices are known in the prior art, but no practically effective device therefore is available on the market at reasonable cost. One of the objects of this invention, therefore, is to provide such a device which is simple in construction, easy to manufacture and economical in cost, as well as durable and efficient in operation.

Another object is to provide a lever operated, play detecting mechanism for oscillating the parts of said joints which are subject to wear so as to displace said parts with respect to one another, and to provide means for simultaneously measuring the amount of such displacement.

A further object is to provide a simple means for testing a tire for out-of-roundness by providing a pressure operated roller for frictional engagement with the tire, with means to measure the amount of out-of-roundness reflected by the movement of the pressure roller against the tire. Other objects and advantages will become apparent as the description proceeds. In the drawings, FIG. 1 is a side elevation of a portion of a frame of a vehicle showing the ball joints, with the device of the invention in position for testing said joints FIG. 2 is a fragmentary perspective view of the measuring means of the invention.

FIG. 3 is an elevational view taken on the line 3—3 of FIG. 4.

FIG. 4 is a front elevational view.

FIGS. 5 and 6 are partial side elevation views of the test device in two additional operational positions.

The device or tool comprises a base plate 10, having a pair of spaced vertical plates 11 and 11a, permanently fixed to the base plate by welding or otherwise. A lower rod 12 is supported by said plates adjacent one side edge of said plates and connects said plates together, said rod supporting a rotatable sleeve 13 which extends to the walls of the respective plates and acts as a spacer between them. An elongated, manually operated axial play detecting lever 14 is welded to said sleeve as indicated at 14a in FIG. 3, said lever extending in opposite directions from said sleeve and having a handle 14b at its upper end and a lifting pad 14c at its lower end. An arm 15, spaced from said lever, and welded or otherwise fixedly mounted on the sleeve 13, extends radially upwardly of said sleeve to a point near the upper end of plate 11.

An upper rod 16, above the rod 12, and rearwardly thereof, is also supported by said plates and likewise connects them together, said rod also carrying a rotatable sleeve 17 serving as a spacer between the plates. At one end, said rod 16 carries a vertically extending arm 18, adjacent the outside wall of plate 11, and to the upper end an arcuate, calibrated dial 19 is formed. Said arm 18 is rotatable on the rod 16 and movable with respect to plate 11. It is spaced from the plate and nut 16a by means of non-frictional nylon or fiber washers. The rod 16 is retained by means of nuts 16a, 16b screwed on the ends thereof. Between said plates, and fixed on said sleeve 17 by welding or otherwise, is a pointer of indicating means, e.g., an arm 20 extends adjacent the plate 11, above and below said sleeve, the upper portion extending above said calibrated dial and terminating in an arrow 20a bent over said dial to point to said calibrations. The lower end of said arm, below said sleeve, carries a pin 21 extending into the path of movement of said arm 15, as will be explained.

The nuts 16a, 16b serve to hold the plates 11, 11a tightly against the sleeves, but yet permit rotation of said sleeves and permit adjustment of the dial 19 with respect to the pointer of the arrow 20a in any position that the latter may assume during testing.

Fixed to the upper rotating sleeve 17 adjacent the plate 11a, is a downwardly extending arm 22, having a pin 23 extending inwardly therefrom for a purpose which will be explained. The sleeve 17 has an integral collar or boss 17a which is secured to the sleeve by a set screw to fix it thereon.

Adjacent the inner wall of the plate 11a, a radial play detecting a bell crank lever 24 is pivoted with respect to said wall by means of a pivot 25. One portion of the lever extends upwardly from the pivot 25, extending beyond the forward edges of the plates 11, 11a and supports a freely rotatable roller 26 extending outside of said plates, as shown in FIG. 3. The upper portion 24a of the bell crank lever extends angularly and upwardly towards the arm 22, being spaced slightly laterally therefrom and extending between said arm and the plate 11a. Adjacent its free end, said lever carries a pin 27 projecting inwardly of the arm, so as to lie in the path of the movement of the arm 22.

Between the roller 26 and the pin 27, FIG. 3, the arm 24a carries another pin 28, substantially parallel to the pin 23. The two pins 23 and 28 are connected by a tension spring 29, the spring yieldably urging the arm 22 and the pin 27 together, so that movement of the pin results in consequent movement of the arm 22. The lower end of the bell crank lever, below the pivot 25, has an inwardly extending pin 30 which is connected by tension spring 31 to a pin 32 seated in the wall of plate 11a. The spring 31 is more powerful in its tension and normally overpowers the spring 29 to pull roller 26 forwardly of the plates 11, 11a.

In operation, and to test and determine the amount of axial play in a ball joint, the device is positioned with respect to a vehicle wheel as shown in FIG. 1, with the pad 14c placed beneath the tire which has been raised off the ground. The handle 14a may then be pumped slightly to give the wheel an oscillating movement to detect or sense any looseness or play in the ball joints A and B connecting the wheel to the frame. The handle is then rested against the pin P inserted through holes H in plates 11 and 11a above the lever 14 to fix it in a rest position. Since movement of the handle causes lever 15 to move the pointer, the zero of the dial must be adjusted to the pointer. This is accomplished simply by rotating the dial arm 18 until the zero on the dial 19 is aligned with the point of the arrow 20a. The handle is now pumped slightly again to oscillate the wheel assembly and to detect and measure the amount of looseness or play between the ball socket and the ball joint, the pointer 20a reflecting this on the dial. The amount of axial play, if any, in the ball joints is transmitted through the lever 14, sleeve 13, arm 15, pin 21 to arm 20 and arrow 20a, which moves in response to the movements of the lever 14, to reflect on the calibrated dial the amount of play present in the joints. Appropriate maintenance may then be programmed to correct what defects are found. The amount of play in a king pin joint may be determined in the same manner.

In the foregoing, the testing was accomplished in a substantially vertical direction to determine the amount of up and down play. The lateral play or wear in a sidewise direction may be tested and determined by placing the roller 26 in frictional engagement with the side S of the tire, as in FIG. 5, and pushing and pulling the tire manually for the full extent of its movement. With the dial 19 first zeroed on the arrow, this lateral movement will be registered by the pointer on the dial to indicate the amount of lateral play or wear in the ball joints.

Further, to test the out-of-round of a tire, the tire is jacked up and the gauge device is placed against the tire tread as in FIG. 6, so that the roller 26 is in frictional contact with the tread of the tire. The dial is again zeroed with respect to the arrow and slow manual rotation of the tire will cause any irregularity to be measured on the dial through the pressure the wheel exerts on the roller and through the movement of the bell crank lever around the pivot 25 under control of the tension springs 29 and 31. The motion of the bell crank lever around pivot 25 is transmitted through pin 27, arm 22, sleeve 17 to arm 20 and arrow 20a, whereupon the a mount of irregularity can be read upon the dial 19. The dial may be calibrated in fractions, in thousandths of an inch, or otherwise.

In making these last two tests, the stop pin P, FIG. 5, is first inserted into the holes H provided therefor in plates 11, 11a to raise the lever and hold it in raised position to take its pressure off the pin 21 so as to isolate or disengage the pointer arm 20 from the effect of the weight of the lever. The pointer arm will then be subject only to displacement by forces exerted thereon by the bell crank lever 24 through spring 29 and pin 27.

Thus, the machine fully discloses the various faults which occur in ball joints and the like, and the extent thereof, to help determine the kind and amount of correction required.

I claim:

1. Means for measuring the amount of play in ball joints and the like comprising a base, a pair of spaced supports erected on said base, a first rod connecting said supports, a second rod connecting said supports and spaced from said first rod, a means rotatable on said first rod and a lever fixed to said means, said lever having means at one end for supporting the load of a ball joint assembly, and an operating handle at the other end; a dial for measuring the amount of play in said assembly, a pointer mounted on said second rod for indicating the amount of said play on said dial, and means operable by the movement of said lever and actuating said pointer to indicate the amount of play on said dial, the zero of said dial being adjustable with respect to said pointer so, that a reading can be taken thereof of the movement of said pointer, the pointer comprising an arm pivoted on said second rod, said arm having a pin extending therefrom into the path of a second arm, and said operating means comprises said second arm on said rotatable means, said second arm being engagable with said pin when said lever is operated.

2. Testing and measuring apparatus for a vehicle wheel front end assembly, comprising a support, a pair of motion detecting devices mounted by the support, indicating means mounted by the support for alternatively gauging the amount of motion sensed by each of the detecting devices, and means for transmitting motion sensed by the detecting devices to the indicating means, including means for isolating the indicating means from force exerted by one of the detecting devices while the other of the detecting devices is sensing motion, each of the detecting devices including means for engaging the vehicle wheel, said other of the detecting devices further including means for biasing the indicating means into engagement with the transmitting means of said one of the detecting devices.

3. Means for measuring the amount of axial play in ball joints or the like, comprising a support, a pair of spaced pivot assemblies mounted by the support, a lever connected to one of the pivot assemblies having a wheel periphery engagement member and an operating handle to effect engagement of said member with a wheel periphery at the lower side thereof and operative to lift said wheel thereby to an extent determined by axial ball joint play; a pointer connected to the other of the pivot assemblies, dial means mounted by the support for adjustable positioning relative to the pointer, operating means connected to the lever and responsive to movement thereof for actuating the pointer to indicate the amount of axial play on the dial means, said operating means including an arm projecting from said one of the pivot assemblies and engagable with the pointer during operation of the lever.

4. The combination of claim 3 including a second lever, a third pivot assembly pivotally mounting the second lever on the support, load engaging means mounted on the second lever for displacement thereof, yieldable means connecting the second lever to the pointer, and means for biasing the second lever out of engagement with the pointer.

5. The combination of claim 4 including stop means engagable with the first mentioned lever for selectively preventing engagement between the second lever and the pointer, whereby the biasing means urges the pointer into engagement with the arm through the second lever and the yieldable means.

6. A front wheel suspension assembly testing device for measuring axial and radial play particularly in ball joints of a suspension, comprising support means having a fulcrum element and an actuating lever pivotally fulcrummed thereon and having a wheel engaging member and a handle on opposite sides of the fulcrum element, whereby a vehicle wheel periphery can be engaged by said member by actuation of said handle and said wheel then lifted to an extent determined by axial play in said suspension in a plane substantially perpendicular to a floor on which the support means stands, and indicating means coupled to said lever to indicate extent extend of said play, said member being disposed horizontally outwardly of said support means and at a level relative to said floor so as to engage said wheel at a lowermost portion of the periphery thereof with said support means spaced horizontally from said wheel.

7. A device as set forth in claim 6, said indicator means comprising an indicator arm pivotally carried by said support means, bias means positioning said indicator arm in an initial position; abutment means intermediate said actuating lever and said indicator arm to effect movement thereof upon movement of said actuating lever in one direction; and scale means to measure the extent of such movement.

8. A device as set forth in claim 7, said bias means comprising a second actuating lever pivotally carried by said support means and having wheel engaging means extending outwardly of said support means and positioned to engage the side of a wheel and to be movable thereby when said wheel is rocked on a substantially horizontal axis, dependent on radial play in said suspension; second abutment means wherein said second actuating lever motivates said indicator arm to effect said initial position and also to move said indicator arm to an extent determined by said rocking of said wheel whereby said radial play is measurable on said scale means.

9. A device as set forth in claim 8, said bias means comprising spring means intermediate said second lever and said support means; said first-mentioned abutment means comprising an abutment pin carried by said engagable arm and engageable by said first-mentioned actuating lever in one direction of movement thereof.

10. A device as set forth in claim 9, including means to maintain disengagement between said latter abutment pin and said first-mentioned actuating lever when said first-mentioned actuating lever is not in use.

* * * * *